(12) United States Patent
Jeon et al.

(10) Patent No.: US 11,186,682 B2
(45) Date of Patent: Nov. 30, 2021

(54) COPOLYCARBONATE AND METHOD FOR PREPARING THE SAME

(71) Applicant: LG CHEM, LTD., Seoul (KR)

(72) Inventors: Byoungkue Jeon, Daejeon (KR); Youngwook Son, Daejeon (KR); Daehyeon Hwang, Daejeon (KR); Mooho Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 10 days.

(21) Appl. No.: 16/632,847

(22) PCT Filed: Jan. 31, 2019

(86) PCT No.: PCT/KR2019/001384
§ 371 (c)(1),
(2) Date: Jan. 21, 2020

(87) PCT Pub. No.: WO2019/156432
PCT Pub. Date: Aug. 15, 2019

(65) Prior Publication Data
US 2020/0148818 A1    May 14, 2020

(30) Foreign Application Priority Data

Feb. 7, 2018 (KR) .................. 10-2018-0015214

(51) Int. Cl.
C08G 64/14 (2006.01)
C08G 63/64 (2006.01)

(52) U.S. Cl.
CPC ................... C08G 64/14 (2013.01)

(58) Field of Classification Search
None
See application file for complete search history.

(56) References Cited

U.S. PATENT DOCUMENTS

| | | | |
|---|---|---|---|
| 4,333,809 A * | 6/1982 | Schreckenberg | C08G 64/18 522/163 |
| 4,579,934 A * | 4/1986 | Brinkmeyer | C08G 63/64 528/125 |
| 5,034,496 A | 7/1991 | Bales et al. | |
| 6,187,492 B1 | 2/2001 | Ri et al. | |
| 6,486,293 B1 | 11/2002 | Ri et al. | |
| 7,514,522 B2 | 4/2009 | Ishikawa et al. | |
| 8,207,287 B1 | 6/2012 | Morizur | |
| 9,481,761 B2 | 11/2016 | Morizur et al. | |
| 9,751,980 B2 | 9/2017 | Morizur et al. | |
| 2010/0168311 A1 | 7/2010 | Jansen et al. | |
| 2014/0275321 A1 | 9/2014 | Morizur et al. | |
| 2015/0197609 A1* | 7/2015 | Morizur | B05D 3/067 427/508 |
| 2016/0272759 A1 | 9/2016 | Park et al. | |
| 2017/0129997 A1 | 5/2017 | Lyakhovych et al. | |
| 2017/0166742 A1 | 6/2017 | Hoover et al. | |
| 2017/0184971 A1 | 6/2017 | Johnson | |
| 2017/0313815 A1 | 11/2017 | Fernandez | |

FOREIGN PATENT DOCUMENTS

| | | |
|---|---|---|
| CN | 104470889 | 3/2015 |
| CN | 105073830 | 11/2015 |
| CN | 107075098 | 8/2017 |
| EP | 0286877 A2 | 10/1988 |
| EP | 2 857 384 A1 | 4/2015 |
| JP | H01-210422 | 8/1989 |
| JP | H07-62072 | 3/1995 |
| JP | 2000-352830 | 12/2000 |
| JP | 2001-040083 | 2/2001 |
| JP | 2002-226571 | 8/2002 |
| JP | 2007056216 | 3/2007 |
| JP | 2012514089 | 6/2012 |
| JP | 2014-113961 A | 6/2014 |
| JP | 2015-528816 | 10/2015 |
| KR | 10-19920005276 | 6/1992 |
| KR | 10-20140035482 | 3/2014 |
| KR | 10-20170023835 | 3/2017 |
| WO | 2015193862 | 12/2015 |

OTHER PUBLICATIONS

Makimura et al., "Modification of Polycarbonate Terminals with Benzophenone Derivative via Transesterification" Polymer Journal 29(2): 128-133 (1997).

* cited by examiner

Primary Examiner — David J Buttner
(74) Attorney, Agent, or Firm — Dentons US LLP

(57) ABSTRACT

Provided is a copolycarbonate comprising a first repeating unit of Chemical Formula 1, a second repeating unit of Chemical Formula 2, and a terminal capping group of Chemical Formula 3:

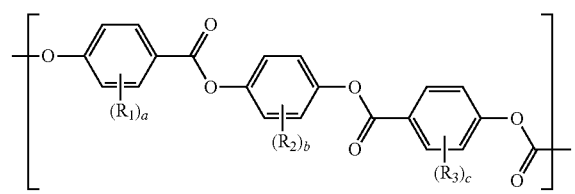

[Chemical Formula 1]

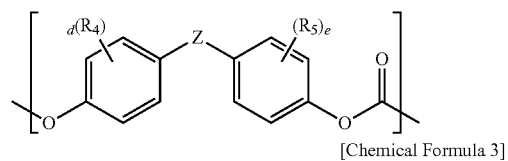

[Chemical Formula 2]

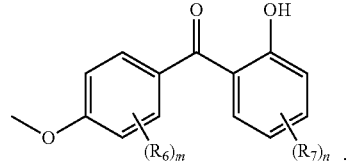

[Chemical Formula 3]

Also provided are a method of preparing the copolycarbonate and a molded article including the copolycarbonate.

13 Claims, No Drawings

COPOLYCARBONATE AND METHOD FOR PREPARING THE SAME

CROSS REFERENCE TO RELATED APPLICATIONS

This application is a National Stage Application of International Application No. PCT/KR2019/001384 filed on Jan. 31, 2019, which claims priority to and the benefit of Korean Patent Application No. 10-2018-0015214 filed on Feb. 7, 2018 with the Korean Intellectual Property Office, the disclosures of which are incorporated herein by reference in their entirety.

BACKGROUND OF THE INVENTION

(a) Field of the Invention

BACKGROUND OF THE INVENTION

(a) Field of the Invention

The present invention relates to a copolycarbonate having excellent weather resistance and a method of preparing the same.

(b) Description of the Related Art

A polycarbonate is a polymer material which is applied to a wide range of fields such as for exterior materials of electrical and electronic products, automotive parts, construction materials, optical components, etc. due to excellent physical properties such as impact strength, dimensional stability, heat resistance, transparency, etc.

With a recent expansion of the application fields of polycarbonates, there is a demand for a novel structure of a copolycarbonate which has improved weather resistance while maintaining its intrinsic physical properties.

Accordingly, studies have been made to obtain desired properties by copolymerizing two or more aromatic diols having different structures to introduce a monomer having a different structure to a main chain of a polycarbonate. However, most technologies have limitations in that production cost is high, and transparency is deteriorated when chemical resistance or impact strength is improved, or chemical resistance or impact strength is deteriorated when transparency is improved.

Accordingly, there is a need for the development of a novel structure of a copolycarbonate having superior weather resistance while having excellent mechanical properties such as tensile strength, impact strength, etc.

SUMMARY OF THE INVENTION

The present invention provides a copolycarbonate having excellent weather resistance by introducing a specific structure.

Further, the present invention provides a method of preparing the copolycarbonate.

According to the present invention, a copolycarbonate including a first repeating unit of the following Chemical Formula 1, a second repeating unit of the following Chemical Formula 2, and a terminal capping group of the following Chemical Formula 3 is provided.

According to the present invention, a method of preparing a copolycarbonate is provided, the method including the step of polymerizing a composition including a monomer of the following Chemical Formula 4, a monomer of the following Chemical Formula 5, a terminal capping agent containing an aromatic diol of the following Chemical Formula 6, and a carbonate precursor.

According to the present invention, a molded article including the copolycarbonate is provided.

Hereinafter, a copolycarbonate according to a specific embodiment of the present invention, a method of preparing the same, and a molded article including the same will be described in more detail.

Unless otherwise specified, the technical terms used herein are just for explaining exemplary embodiments and are not intended to restrict the present invention.

A singular expression used herein can include a plural expression unless it is differently expressed contextually.

It must be understood that the term 'including' used herein is only for specifying stated features, regions, integers, steps, operations, elements, and/or components, but does not preclude the presence or addition of other features, regions, integers, steps, operations, elements, components, and/or groups thereof.

Although terms including ordinal numbers such as 'first' and 'second' can be used herein to distinguish one element from another, these elements should not be limited by the ordinal numbers. For example, a first element could be termed a second element, and similarly, a second element could be termed a first element, without departing from the scope of the present invention.

I. Copolycarbonate

According to one embodiment of the present invention, a copolycarbonate including a first repeating unit of the following Chemical Formula 1, a second repeating unit of the following Chemical Formula 2, and a terminal capping group of the following Chemical Formula 3 is provided:

[Chemical Formula 1]

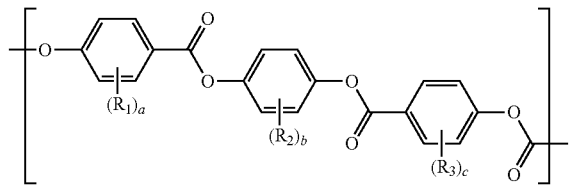

wherein in Chemical Formula 1:
$R_1$ to $R_3$ are each independently hydrogen or a substituted or unsubstituted $C_{1-60}$ alkyl and
a, b, and c are each independently an integer from 1 to 4;

[Chemical Formula 2]

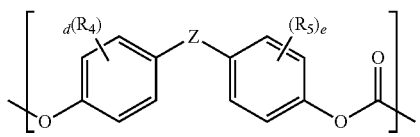

wherein in Chemical Formula 2:
Z is a $C_{1-10}$ alkylene unsubstituted or substituted with phenyl, a $C_{3-15}$ cycloalkylene unsubstituted or substituted with a $C_{1-10}$ alkyl, O, S, SO, $SO_2$, or CO;

$R_4$ and $R_5$ are each independently hydrogen or a substituted or unsubstituted $C_{1-60}$ alkyl; and d and e are each independently an integer from 1 to 4;

[Chemical Formula 3]

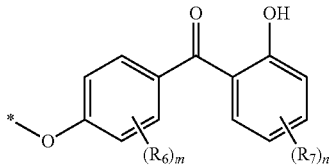

wherein in Chemical Formula 3;

$R_6$ and $R_7$ are each independently hydrogen or a substituted or unsubstituted $C_{1-60}$ alkyl;

m and n are each independently an integer from 1 to 4; and the asterisk (*) indicates a bonding point.

A copolycarbonate is a material having excellent physical properties such as impact strength, dimensional stability, heat resistance, transparency, etc., and is applied to a wide range of fields. Accordingly, there is a demand for a novel structure of a copolycarbonate which has improved weather resistance while maintaining its intrinsic physical properties. As a result of continuous studies, the present inventors found that when the repeating unit such as Chemical Formula 1 is introduced in the preparation of a copolycarbonate, long-term weather resistance can be realized by occurrence of a Fries rearrangement, and in particular, the effect of maintaining initial weather resistance (500 h or less) can be improved by replacing ester and ether bonds at the para position based on all benzene rings in Chemical Formula 1. Further, the terminal capping agent of Chemical Formula 3 has a structure which can undergo keto-enol tautomerization, thereby further improving the weather resistance and enhancing the effect of maintaining long/short-term weather resistance.

Accordingly, when the copolycarbonate of the present invention is applied to automotive interior/exterior materials, light housings, plastic exterior material products for construction, etc., excellent weather resistance can be achieved even though exposed to light, high temperature, and high pressure conditions during a manufacturing process of the products or a practical application of the products.

In Chemical Formula 1, $R_1$ to $R_3$ can each independently be hydrogen or a substituted or unsubstituted $C_{1-20}$ alkyl, preferably hydrogen or a substituted or unsubstituted $C_{1-10}$ alkyl, and more preferably hydrogen. Specifically, $R_1$ to $R_3$ can each independently be hydrogen, methyl, ethyl, propyl, butyl, pentyl, hexyl, heptyl, octyl, nonyl, or decyl.

In Chemical Formula 1, a, b, and c can each independently be an integer from 1 to 3 or an integer from 1 to 2.

The repeating unit of Chemical Formula 2 can be derived from one or more aromatic diol compounds selected from the group consisting of bis(4-hydroxyphenyl)methane, bis(4-hydroxyphenyl), bis(4-hydroxyphenyl)sulfone, bis(4-hydroxyphenyl)sulfoxide, bis(4-hydroxyphenyl)sulfide, bis(4-hydroxyphenyl)ketone, 1, -bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-hi s(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α, ω-bis[3-(o-hydroxyphenyl)propyl]polydimethylsiloxane hydroxyphenyl)propyl)polydimethylsiloxan.

The meaning of 'derived from aromatic diol compounds' is that hydroxyl groups of the aromatic diol compound and a carbonate precursor are reacted to form the second repeating unit of Chemical Formula 2.

In Chemical Formula 2, $R_4$ and $R_5$ can each independently the hydrogen or a substituted or unsubstituted $C_{1-20}$ alkyl, preferably hydrogen or a substituted or unsubstituted $C_{1-10}$ alkyl, and more preferably hydrogen. Specifically, $R_4$ and $R_5$ can each independently be hydrogen, methyl, ethyl, propyl, butyl, pentyl, hexyl, heptyl, octyl, nonyl, or decyl.

In Chemical Formula 2, d and e can each independently be an integer from 1 to 3 or an integer from 1 to 2.

The second repeating unit of Chemical Formula 2 can preferably include a repeating unit of the following Chemical Formula 2-1, wherein the repeating unit of the following Chemical Formula 2-1 is a polymerization product of an aromatic diol compound bisphenol A and a carbonate precursor triphosgene.

[Chemical Formula 2-1]

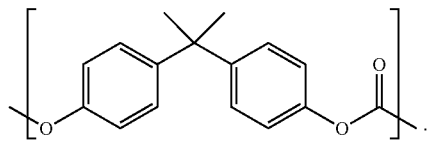

In Chemical Formula 3, $R_6$ and $R_7$ can each independently be hydrogen or a substituted or unsubstituted $C_{1-20}$ alkyl, preferably hydrogen or substituted or unsubstituted $C_{1-10}$ alkyl, and more preferably hydrogen. Specifically, $R_6$ and $R_7$ can each independently be hydrogen, methyl, ethyl, propyl, butyl, pentyl, hexyl, heptyl, octyl, nonyl, or decyl.

In Chemical Formula 3, m and n can each independently be an integer PM from 1 to 3 or an integer from 1 to 2.

In a specific embodiment of the present invention, physical properties of the copolycarbonate can be improved by controlling the contents of the repeating units of the copolycarbonate. A molar ratio of the first repeating unit of Chemical Formula 1 and the second repeating unit of Chemical Formula 2 can be 1:99 to 50:50, and preferably 5:95 to 30:70.

When the repeating units are included within the above content range, weather resistance can be remarkably improved while maintaining intrinsic physical properties of the polycarbonate.

A weight ratio of each repeating unit corresponds to a weight ratio of each monomer used in the preparation of the copolymer.

The terminal capping group of Chemical Formula 3 can be included in an amount from 0.0001% by weight to 0.1% by weight, preferably 0.001 to 0.05% by weight, and more preferably 0.01 to 0.03% by weight with respect to the total amount of the copolycarbonate.

When the terminal capping group is included within the above content range, the effect of maintaining long/short-term weather resistance can be preferably improved. When the terminal capping group is included in an amount of less than 0.0001% by weight, it is difficult to achieve the desired effect due to the small amount, and in particular, a processability problem can be generated due to the increase of molecular weight. Further, when the terminal capping group is included in an amount of more than 0.1% by weight, a problem of reduction of mechanical properties can be generated due to the decrease of molecular weight.

Further, the copolycarbonate can have a weight average molecular weight of 10,000 g/mol to 100,000 g/mol, or 30,000 g/mol to 700,000 g/mol. When the copolycarbonate has a weight average molecular weight of less than 10,000 g/mol, there is a problem that impact resistance can be greatly reduced. When the copolycarbonate has a weight average molecular weight of more than 100,000 g/mol, injection moldability can be rather deteriorated.

II. Method of Preparing Copolycarbonate

According to an embodiment of the present invention, a method of preparing the copolycarbonate is provided, the method including the step of polymerizing a composition including a monomer of the following Chemical Formula 4, a monomer of the following Chemical Formula 5, a terminal capping agent containing an aromatic diol of the following Chemical Formula 6, and a carbonate precursor:

[Chemical Formula 4]

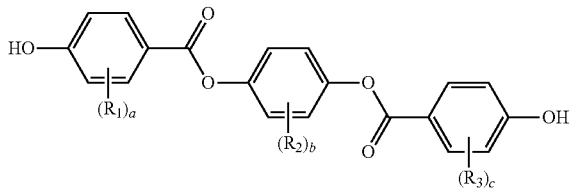

wherein in Chemical Formula 4:
$R_1$ to $R_3$ can each independently be hydrogen or a substituted or a unsubstituted $C_{1-60}$ alkyl; and
a, b, and c can each independently be an integer from 1 to 4.

[Chemical Formula 5]

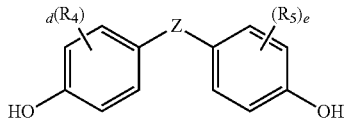

wherein in Chemical Formula 5:
Z can be a $C_{1-10}$ alkylene unsubstituted or substituted with phenyl, a $C_{3-15}$ cycloalkylene unsubstituted or substituted with a $C_{1-10}$ alkyl, O, S, SO, $SO_2$, or CO;
$R_4$ and $R_5$ can each independently be hydrogen or a substituted or unsubstituted $C_{1-60}$ alkyl; and
d and e can each independently be an integer from 1 to 4;

[Chemical Formula 6]

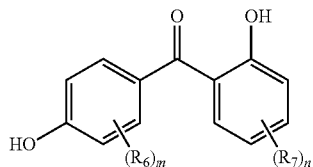

wherein in Chemical Formula 6:
$R_6$ and $R_7$ can each independently be hydrogen or a substituted or unsubstituted $C_{1-60}$ alkyl; and
m and n can each independently be an integer from 1 to 4.

The preparation method according to an embodiment of the present invention can include the step of polymerizing the composition including the monomer of Chemical Formula 4, the monomer of Chemical Formula 5, the terminal capping agent containing an aromatic diol of Chemical Formula 6, and the carbonate precursor. Through the polymerization step, it is possible to obtain the copolycarbonate including the first repeating unit of Chemical Formula 1, the second repeating unit of Chemical Formula 2, and the terminal capping group of Chemical Formula 3.

More specifically, the first repeating unit of Chemical Formula 1 can be formed by polymerization of the monomer of Chemical Formula 4, the second repeating unit of Chemical Formula 2 can be formed by polymerization of the monomer of Chemical Formula 5, and the terminal capping group of Chemical Formula 3 can be formed by polymerization of the aromatic diol of Chemical Formula 6 and part of the monomers.

In Chemical Formula 4, a, b, and c can each independently be an integer of 1 to 3 or an integer of 1 or 2.

In Chemical Formula 4, a, b, and c can each independently be an integer from 1 to 3 or an integer from 1 to 2.

In Chemical Formula 5, $R_4$ and $R_5$ can each independently be hydrogen or a substituted or unsubstituted $C_{1-20}$ alkyl, preferably hydrogen or a substituted or unsubstituted $C_{1-10}$ alkyl, and more preferably hydrogen. Specifically, $R_4$ and $R_5$ can each independently be hydrogen, methyl, ethyl, propyl, butyl, pentyl, hexyl, heptyl, octyl, nonyl. Or decyl.

In Chemical Formula 5, d and e can each independently be an integer from 1 to 3 or an integer from 1 to 2.

In Chemical Formula 6, $R_6$ and $R_7$ can each independently be hydrogen or a substituted or unsubstituted $C_{1-20}$ alkyl, preferably hydrogen or a substituted or unsubstituted. $C_{1-10}$ alkyl, and more preferably hydrogen. Specifically, $R_6$ and $R_7$ can each independently be hydrogen, methyl, ethyl, propyl, butyl, pentyl, hexyl, heptyl, octyl, nonyl, or decyl.

In Chemical Formula 6, m and n can each independently be an integer from 1 to 3 or an integer from 1 to 2.

The monomer of Chemical Formula 4 can be a monomer of the following Chemical Formula 4-1:

[Chemical Formula 4-1]

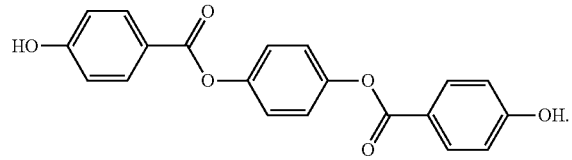

Further, the monomer of Chemical Formula 4 can exhibit the effect of long-term weather resistance due to its structure which can undergo Fries rearrangement.

The monomer of Chemical Formula 5 can be one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)

propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxan.

Preferably, the monomer of Chemical Formula 5 can be bisphenol A.

The aromatic diol of Chemical Formula 6 which is a terminal capping agent used to control the molecular weight of the copolycarbonate during polymerization can exhibit excellent weather resistance due to its structure which can undergo keto-enol tautomerization.

The aromatic diol of Chemical Formula 6 has two substituted or unsubstituted phenols bound to a carbonyl group. Specifically, the aromatic diol can include a phenolic hydroxyl group ortho to the carbonyl group and a phenolic hydroxyl group para to the carbonyl group.

Since the phenolic hydroxyl group para to the carbonyl group is relatively distant from the carbonyl group, it has high reaction selectivity for the polymerization with the monomers of Chemical Formula 4 and Chemical Formula 5, and thus acts as the terminal capping agent. On the contrary, since the phenolic hydroxyl group ortho to the carbonyl group is relatively close to the carbonyl group, it has low selectivity for the polymerization, and thus may not be polymerized with the monomers. Although the aromatic diol of Chemical Formula 6 includes two hydroxyl groups, only the phenolic hydroxyl group para to the carbonyl group participates in the polymerization reaction to act as the terminal capping agent. As a result, the copolycarbonate including the aromatic diol can have excellent weather resistance.

The aromatic diol of Chemical Formula 6 can be, for example, an aromatic diol of the following Chemical Formula 6-1,

[Chemical Formula 6-1]

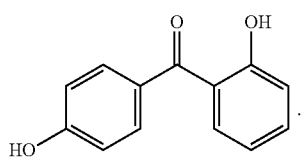

The terminal capping agent can further include, for example, a mono-alkylphenol. The mono-alkylphenol can be, for example, one or more selected from the group consisting of p-tert-butylphenol, p-cumylphenol, decylphenol, dodecylphenol, tetradecylphenol, hexadecylphenol, octadecylphenol, eicosylphenol, docosylphenol, and triacontyl phenol.

The terminal capping agent can be introduced before initiation of the polymerization, during the polymerization, or after initiation of the polymerization.

As described above, the terminal capping agent can be included in an amount from 0.0001% weight to 0.1% by weight, preferably 0.001% by weight to 0.05% by weight, and more preferably 0.01% by weight to 0.03% by weight with respect to the total amount of the copolycarbonate finally prepared.

The carbonate precursor can serve to link the monomer of Chemical Formula 4. The monomer of Chemical Formula 5, and/or the aromatic diol of Chemical Formula 6, and specific examples thereof can be one or more selected from the group consisting of phosgene, ti phosgene, diphosgene, bromophosgene, dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthylcarbonate, bis(diphenyl) carbonate, and bishaloformate.

The carbonate precursor can be included in an amount from 10 mol % to 70 mol %, preferably 15 mol % to 50 mol %, or more preferably 20 mol % to 40 mol % with respect to the total content of the monomer of Chemical Formula 4 and the monomer of Chemical Formula 5.

When the carbonate precursor is included in an amount of less than 10 mol %, it is difficult to achieve the desired effect due to the small amount, and in particular, quality deterioration of the product can be caused by unreacted diol-based monomers. Further, when the carbonate precursor is included in an amount of more than 70 mol %, there is a problem that the commercial cost increases greatly.

In a specific embodiment of the present invention, any method used in the preparation of a polycarbonate can be applied to the polymerization reaction without particular limitation. Preferably, interfacial polymerization can be performed. When the interfacial polymerization is performed, the polymerization reaction can be made at a low temperature and atmospheric pressure, and it is easy to adjust the molecular weight.

Preferably, the polymerization temperature is 0° C. to 40° C., and the reaction time is 10 minutes to 5 hours. Further, pH during the reaction is preferably maintained at 9 or more or 11 or more.

A solvent usable in the polymerization is not particularly limited, as long as it is a solvent used in the art for the polymerization of a copolycarbonate. For example, a halogenated hydrocarbon such as methylene chloride, chlorobenzene, etc. can be used.

The polymerization is preferably conducted in the presence of an acid binding agent. Further, the acid binding agent can include alkali metal hydroxides such as sodium hydroxide, potassium hydroxide, etc., or amine compounds such as pyridine, etc.

Further, to accelerate the polymerization reaction, a reaction accelerator, for example, a tertiary amine compound, a quaternary ammonium compound, or a quaternary phosphonium compound, such as triethylamine, tetra-n-butyl ammonium bromide, tetra-n-butylphosphonium bromide, etc., can be further used.

III. Molded Product Including Copolycarbonate

According to an embodiment of the present invention, a molded article including the above-described copolycarbonate is provided.

The molded article according to the present invention can preferably be applied to automotive interior/exterior materials, light housings, interior/exterior materials for construction, etc., and can exhibit superior weather resistance and hardness while having excellent impact strength, dimensional stability, heat resistance, and transparency which are intrinsic properties of existing polycarbonates.

Particularly, the molded article can exhibit an excellent effect of maintaining long/short-term weather resistance even though exposed to light, high temperature, and high pressure conditions during a manufacturing process of the products or a practical application of the products.

According to the present invention, the copolycarbonate having excellent weather resistance and the method of preparing the same are provided.

DETAILED DESCRIPTION OF THE EMBODIMENTS

Hereinafter, preferred examples will be provided for better understanding of the present invention. However, the following examples are for illustrative purposes only, and the present invention is not intended to be limited by these examples.

EXAMPLES AND COMPARATIVE EXAMPLES: PREPARATION OF COPOLYCARBONATE

Example 1

To a 20 L glass reactor, 1,014.57 g (4.44 mol) of bisphenol A (BPA), 1785 g of a 40% NaOH aqueous solution, 156.64 g (0.45 mol) of hydroquinone bis(4-hydroxybenzoate), and 7500 g of distilled water were introduced. After confirming that BPA was completely dissolved under a nitrogen atmosphere, 4700 g of methylene chloride was added and mixed. To this mixture, 3850 g of methylene chloride in which 565,3 g (1.q mol) of triphosgene was dissolved was added dropwise for one hour. At this time, the NaOH aqueous solution was maintained at pH 12. After completion of the dropwise addition, 60 g (0.28 mol) of 2,4-dihydroxybenzophenone dissolved in 400 g of methylene chloride was added dropwise. After completion of the dropwise addition, the mixture was left for 15 minutes, and then 10 g of triethylamine was introduced. After 10 minutes, the mixture was adjusted to pH 3 using a 1 N aqueous hydrochloric acid solution, and then washed three times with distilled water. Subsequently, the methylene chloride phase was separated, and then precipitated in methanol to obtain a copolycarbonate resin in the form of a powder.

The finally obtained copolycarbonate resin included the following repeating units, wherein a molar ratio % of a first-A repeating unit and a second-A repeating unit was about 9:91:

[First-A repeating unit]

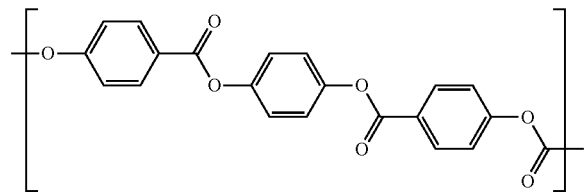

[Second-A repeating unit]

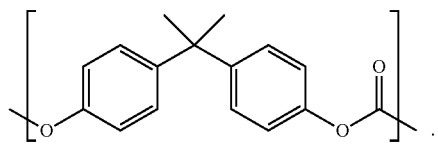

Example 2

A copolycarbonate resin was obtained in the form of a powder in the same manner as in Example 1, except that 316 g (0.9 mol) of hydroquinone bis(4-hydroxybenzoate) was introduced.

The finally obtained copolycarbonate resin included the same repeating units as in Example 1, wherein a molar ratio (%) of the first repeating unit and the second repeating unit was about 17:83.

Example 3

A copolycarbonate resin was obtained in the form of a powder in the same manner as in Example 1, except that 30 g, instead of 60 g, of 2,4-dihydroxybenzophenone was introduced as a terminal capping agent, and 22 g of p-tert-butylphenol (PTBP) was further introduced.

The finally obtained copolycarbonate resin included the same repeating units as in Example 1, wherein a molar ratio (%) of the first repeating unit and the second repeating unit was about 9:91.

Example 4

A copolycarbonate resin was obtained in the form of a powder in the same manner as in Example 1, except that 22 g of p-tert-butylphenol (PTBP) was further introduced in addition to 60 g of 2,4-dihydroxybenzophenone as a terminal capping agent.

The finally obtained copolycarbonate resin included the same repeating units as in Example 1, wherein a molar ratio (%) of the first repeating unit and the second repeating unit was about 9:91.

Comparative Example 1

To a 20 L glass reactor, 978.4 g (4.29 mol) of bisphenol A (BPA), 3.927 g (0.006 mol) of BPDA (bis(4-(2-(4-hydroxyphenyl)propan-2-yl)phenyl) decanedioate), 1620 g of a 40% NaOH aqueous solution, and 7500 g of distilled water were introduced. After confirming that BPA was completely dissolved under a nitrogen atmosphere, 3670 g of methylene chloride and 17.9 g (0.11 mol) of p-tert-butylphenol (PTBP) were added and mixed. To this mixture, 3850 g of methylene chloride in which 542.5 g (1.8 mol) of triphosgene was dissolved was added dropwise for one hour. At this time, the NaOH aqueous solution was maintained at pH 12. After completion of the dropwise addition, the mixture was left for 15 minutes, and then 195.7 g of triethylamine dissolved in methylene chloride was introduced. After 10 minutes, the mixture was adjusted to pH 3 using a 1 N aqueous hydrochloric acid solution, and then washed three times with distilled water. Subsequently, the methylene chloride phase was separated, and then precipitated in methanol to obtain a copolycarbonate resin in the form of a powder.

Comparative Example 2

To a 20 L glass reactor, 232 g (1.02 mol) of bisphenol A (BPA), 385 g of a 32% NaOH aqueous solution, and 1784 g of distilled water were introduced. After confirming that BPA was completely dissolved under a nitrogen atmosphere, 14.3 g (0.1 mol) of p-tert-butylphenol (PTBP) and a mixture (a weight ratio of 95:5) of 12.54 g (0.004 mol) of AP-PDMS (2-allylphenol-substituted polydimethylsiloxane) and 0.66 g (0.0001 mol) of MBHB-PDMS (2-methyl-1-butene hydroxybenzoate-substituted polydimethylsiloxane) were added and mixed. To this mixture, 3850 g of methylene chloride in which 128 g (0.43 mol) of triphosgene was dissolved was added dropwise for one hour. At this time, the NaOH aqueous solution was maintained at pH 12. After completion of the dropwise addition, the reaction product was left for 15 minutes, and 46 g of triethylamine dissolved in methylene chloride was added thereto. After 10 minutes, the mixture was adjusted to pH 3 using a 1 N aqueous hydrochloric acid solution, and then washed three times with distilled water. Subsequently, the methylene chloride phase was separated, and then precipitated in methanol to obtain a copolycarbonate resin in the form of a powder.

AP-PDMS is a compound of the following Chemical Formula A, and MBHB-PDMS is a compound of the following Chemical Formula B:

distilled water. Subsequently, the methylene chloride phase was separated, and then precipitated in methanol to obtain a copolycarbonate resin in the form of a powder.

Comparative Example 6

A copolycarbonate was prepared in the same manner as in Comparative Example 5, except that 60 g (0.28 mol) of 2,4'-dihydroxybenzophenone was used instead of p-tert-butylphenol (PTBP).

[Chemical Formula A]

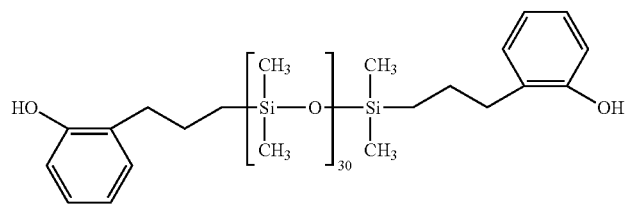

[Chemical Formula B]

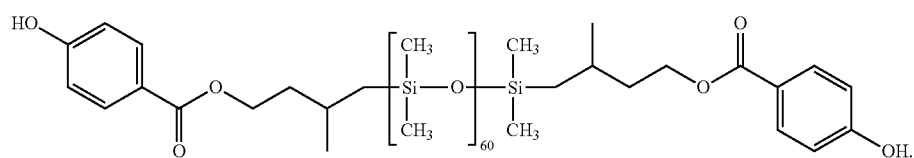

Comparative Example 3

70% by weight of the copolycarbonate of Comparative Example 1 and 30% by weight of the copolycarbonate of Comparative Example 2 were mixed.

Comparative Example 4

50% by weight of the copolycarbonate of Comparative Example 1 and 50% by weight of the copolycarbonate of Comparative Example 2 were mixed.

Comparative Example 5

To a 20 L glass reactor, 1014.57 g (4.44 mol) of bisphenol A (BPA), 1785 g of a 40% NaOH aqueous solution, 130 g (0.61 mol) of (2-hydroxyphenyl)(4-hydroxyphenyl)methanone, 130 g (037 mol) of bis(3-hydroxyphenyl) isophthalate, and 7500 g of distilled water were introduced. After confirming that BPA was completely dissolved under a nitrogen atmosphere, 4700 g of methylene chloride and 64 g (0.18 mol) of bis(3-hydroxyphenyl) terephthalate were added and mixed. To this mixture, 3850 g of methylene chloride in which 565.3 g (1.90 mol) of triphosgene was dissolved was added dropwise for one hour. At this time, the NaOH aqueous solution was maintained at pH 12. After completion of the dropwise addition, 44 g (0.29 mol) of p-tert-butylphenol (PTBP) dissolved in 400 g of methylene chloride was added dropwise. After completion of the dropwise addition, the reaction product was left for 15 minutes, and 10 g of triethylamine was added thereto. After 10 minutes, the mixture was adjusted to pH 3 using a 1 N aqueous hydrochloric acid solution, and then washed three times with Experimental Example: Evaluation of Physical Properties of Copolycarbonate With respect to 1 part by weight of each of the copolycarbonate resins prepared in the examples and comparative examples, 0.050 parts by weight of tris(2,4-di-tert-butylphenyl)phosphite was added, and the resulting mixture was pelletized using a Bau Tech small-sized twin-screw extruder, and then injection-molded using a HAKKE small-sized injection molding machine at a cylinder temperature of 300° C. and a mold temperature of 80° C. to prepare each specimen.

Weight average molecular weights of the resins prepared in the examples and comparative examples were determined by GPC with a PC standard using Agilent 1200 series, and the results are shown in Table 1 below.

1) Weather Resistance Evaluation Test

The copolycarbonate specimens prepared in the examples and comparative examples were irradiated with UV in accordance with ASTM G151 and G155 according to UL746C UV & Water Exposure Test using a weatherometer (ATLAS, CI5000).

First, the yellow index (Y.I.) was measured in accordance with ASTM D630 for the specimens that were not irradiated with UV, the specimens that were irradiated with UV for 500 hours, and the specimens that were irradiated with UV for 1000 hours, and the results are shown in Table 1 below.

2) Impact Strength ($kJ/m^2$)

Impact strength ($kJ/m^2$) was measured using an impact tester of Toyoseiki in accordance with ASTM D256 for the copolycarbonate specimens prepared in the examples and comparative examples, and the results are shown in Table 1 below.

TABLE 1

| Section | Weather resistance | | | Impact resistance (kJ/m$^2$) |
| --- | --- | --- | --- | --- |
| | 0 h | 500 h | 1000 h | |
| Example 1 | 1.34 | 2.43 | 9.8 | 530 |
| Example 2 | 1.38 | 3.04 | 5.32 | 533 |
| Example 3 | 1.44 | 3.01 | 6.66 | 524 |
| Example 4 | 1.30 | 2.88 | 6.98 | 511 |
| Comparative Example 1 | 1.05 | 12.31 | 19.85 | 522 |
| Comparative Example 2 | 3.53 | 15.61 | 23.22 | 538 |
| Comparative Example 3 | 2.23 | 13.33 | 20.38 | 512 |
| Comparative Example 4 | 2.88 | 14.02 | 26.55 | 527 |
| Comparative Example 5 | 1.13 | 7.45 | 13.22 | 547 |
| Comparative Example 6 | 1.59 | 6.25 | 11.4 | 569 |

As shown in Table 1, it was confirmed that specific structures of the repeating units and the terminal capping group can be introduced into the copolycarbonates according to the present invention, thereby improving weather resistance and impact strength at the same time.

In contrast, although those of the comparative examples exhibited impact strength equivalent to those of the examples, the yellow index was remarkably increased over time upon light irradiation.

What is claimed is:

1. A copolycarbonate comprising a first repeating unit of the following Chemical Formula 1, a second repeating unit of the following Chemical Formula 2, and a terminal capping group of the following Chemical Formula 3:

Chemical Formula 1

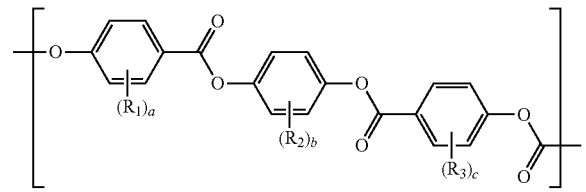

wherein in Chemical Formula 1:
R$_1$ to R$_3$ are each independently hydrogen or a substituted or unsubstituted C$_{1-60}$ alkyl; and
a, b, and c are each independently an integer from 1 to 4;

Chemical Formula 2

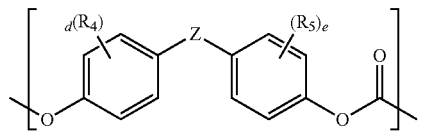

wherein in Chemical Formula 2:
Z is a C$_{1-10}$ alkylene unsubstituted or substituted with phenyl, a C$_{3-15}$ cycloalkylene unsubstituted or substituted with a C$_{1-10}$ alkyl, O, S, SO, SO$_2$, or CO;
R$_4$ and R$_5$ are each independently hydrogen or a substituted or unsubstituted C$_{1-60}$ alkyl; and
d and e are each independently an integer from 1 to 4;

Chemical Formula 3

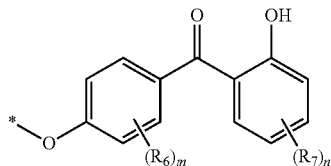

wherein in Chemical Formula 3:
R$_6$ and R$_7$ are each independently hydrogen or a substituted or unsubstituted C$_{1-60}$ alkyl;
m and n are each independently an integer from 1 to 4; and
the asterisk (*) indicates a bonding point.

2. The copolycarbonate of claim 1, wherein in Chemical Formula 1, R$_1$ to R$_3$ are each hydrogen.

3. The copolycarbonate of claim 1, wherein the second repeating unit of Chemical Formula 2 is a repeating unit of the following Chemical Formula 2-1:

Chemical Formula 2-1

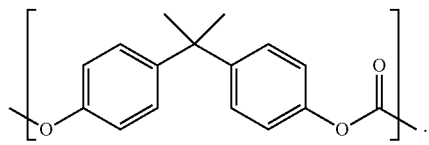

4. The copolycarbonate of claim 1, wherein in Chemical Formula 2, R$_4$ and R$_5$ are each hydrogen.

5. The copolycarbonate of claim 1, wherein in Chemical Formula 3, R$_6$ and R$_7$ are each hydrogen.

6. The copolycarbonate of claim 1, wherein a molar ratio of the first repeating unit of Chemical Formula 1 and the second repeating unit of Chemical Formula 2 is 1:99 to 50:50.

7. The copolycarbonate of claim 1, wherein the terminal capping group of Chemical Formula 3 is included in an amount from 0.0001% by weight to 0.1% by weight with respect to the total amount of the copolycarbonate.

8. The copolycarbonate of claim 1, wherein a weight average molecular weight of the copolycarbonate is 10,000 g/mol to 100,000 g/mol.

9. A method of preparing a copolycarbonate, the method comprising the step of polymerizing a composition including a monomer of the following Chemical Formula 4, a monomer of the following Chemical Formula 5, a terminal capping agent containing an aromatic diol of the following Chemical Formula 6, and a carbonate precursor:

Chemical Formula 4

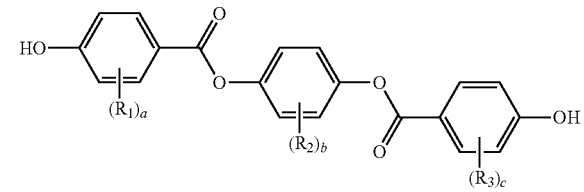

wherein in Chemical Formula 4:
R$_1$ to R$_3$ are each independently hydrogen or a substituted or unsubstituted C$_{1-60}$ alkyl; and
a, b, and c are each independently an integer from 1 to 4;

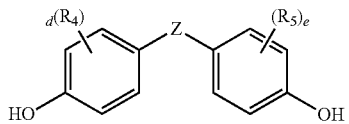

Chemical Formula 5 wherein in Chemical Formula 5:
Z is a $C_{1-10}$ alkylene unsubstituted or substituted with phenyl, a $C_{3-15}$ cycloalkylene unsubstituted or substituted with a $C_{1-10}$ alkyl, O, S, SO, $SO_2$, or CO;
$R_4$ and $R_5$ are each independently hydrogen or a substituted or unsubstituted $C_{1-60}$ alkyl; and
d and e are each independently an integer from 1 to 4;

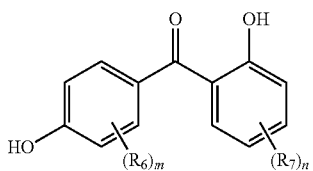

Chemical Formula 6 wherein in Chemical Formula 6:
$R_6$ and $R_7$ are each independently hydrogen or a substituted or unsubstituted $C_{1-60}$ alkyl; and
m and n are each independently an integer from 1 to 4.

10. The method of claim 9, wherein the monomer of Chemical Formula 5 is selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2 bis(4-hydroxy-3-methylphenyl)propane, 2,2-bis(-1-hydroxy-3,5-dimethylphenyl)propane, 1-bis(4-hydroxyphenyl)-1-phenylethane, and bis(4-hydroxyphenyl)diphenylmethane.

11. The method of claim 9, wherein the terminal capping agent further includes one or more selected from the group consisting of p-Cert-butylphenol, p-cumylphenol, decylphenol, dodecylphenol, tetradecylphenol, hexadecylphenol, octadecylphenol, eicosylphenol, docosylphenol, and triacontyl phenol.

12. The method of claim 9, wherein the carbonate precursor is selected from the group consisting of phosgene, triphosgene, diphosgene, bromophosgene, di methyl carbonate, diethyl carbonate, dibutyl carbonate, dicyclohexyl carbonate, diphenyl carbonate, di tolyl carbonate, bis(chlorophenyl) carbonate, m-cresyl carbonate, dinaphthylcarbonate, bis(diphenyl) carbonate, and bishaloformate.

13. A molded article comprising the copolycarbonate of claim 1.

* * * * *